US010762077B2

(12) United States Patent
Ivanov

(10) Patent No.: US 10,762,077 B2
(45) Date of Patent: Sep. 1, 2020

(54) SYSTEM AND METHOD FOR GENERATING AGGREGATE DATA

(71) Applicant: ServiceNow, Inc., Santa Clara, CA (US)

(72) Inventor: Georgi Kamenov Ivanov, Amstelveen (NL)

(73) Assignee: ServiceNow, Inc., Santa Clara, CA (US)

(*) Notice: Subject to any disclaimer, the term of this patent is extended or adjusted under 35 U.S.C. 154(b) by 330 days.

(21) Appl. No.: 15/336,939

(22) Filed: Oct. 28, 2016

(65) Prior Publication Data
US 2018/0121491 A1 May 3, 2018

(51) Int. Cl.
G06F 16/00 (2019.01)
G06F 16/23 (2019.01)

(52) U.S. Cl.
CPC .............................. G06F 16/2379 (2019.01)

(58) Field of Classification Search
CPC .................................................. G06F 16/2379
See application file for complete search history.

(56) References Cited

U.S. PATENT DOCUMENTS

| 5,832,519 | A  | * | 11/1998 | Bowen ................ G01B 5/02 |
| 6,925,466 | B2 |   | 8/2005  | Jensen et al. |
| 8,365,193 | B2 |   | 1/2013  | Chidambaran et al. |
| 2007/0162421 | A1 |   | 7/2007 | Pang et al. |
| 2009/0112831 | A1 | * | 4/2009 | Gupta ............... G06F 17/30038 707/999.004 |
| 2010/0161677 | A1 | * | 6/2010 | Zurek ............... G06F 17/30489 707/802 |
| 2011/0282704 | A1 | * | 11/2011 | Graeber ................ G06Q 10/06 705/7.11 |
| 2013/0091192 | A1 |   | 4/2013 | Shafi et al. |
| 2013/0191500 | A1 |   | 7/2013 | Shafi et al. |
| 2015/0199378 | A1 | * | 7/2015 | Reyntjens ................ G06N 5/00 707/754 |

FOREIGN PATENT DOCUMENTS

WO    2008155545 A2    12/2008

OTHER PUBLICATIONS

Piwik, "Real Time Analytics", Analytics Platform, http://piwik.org/docs/real-time/, Date Unknown, downloaded Oct. 17, 2016, 6 pp.

* cited by examiner

Primary Examiner — Dinku W Gebresenbet
(74) Attorney, Agent, or Firm — Fletcher Yoder PC

(57) ABSTRACT

A system is provided for updating an aggregate value used to generate a display on a client device. The system can include a server device including a processor and a memory, the memory including instructions executable by the processor to: generate the aggregate value based on a set of records stored in a database; generate a metadata record that includes values based on the set of records used to generate the aggregate value; identify a change to the set of records; determine whether the change will affect a validity of the aggregate value; generate an updated aggregate value based on the change and a metadata record; update the metadata record to include values based on the change; and communicate the updated aggregate value to the client device.

27 Claims, 5 Drawing Sheets

SYSTEM AND METHOD FOR GENERATING AGGREGATE DATA

TECHNICAL FIELD

This disclosure relates in general to systems and techniques for generating aggregate data.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Most individuals and organizations, such as businesses and governmental agencies, utilize computers on a daily basis to perform a variety of functions. These functions may include, for example, email, internet access, word processing, computer-aided design, media streaming, and many others. Indeed, individuals and organizations not only utilize their own computers to perform these functions, but since many of the functions are "cloud-based" most individuals and organizations utilize servers in data centers around the globe to perform many of these functions.

As organizations grow, the number of users and, thus, computers and associated devices, such as file servers, email servers, routers, etc., increase as well. These computers and associated devices can be used to provide computerized services to users, such as e-mail services, accounting services, web-based services, expense system services, and the like. Hence, many organizations utilize performance management tools to manage such systems. The performance management tools may include policies, processes, and procedures to measure performance of the computers and associated functionalities for an organization. For example, performance management tools may measure performance of user computers and associated services, software, servers, routers, etc., within an organization and may periodically analyze and display information relating to the measured performance.

BRIEF DESCRIPTION OF THE DRAWINGS

The description herein makes reference to the accompanying drawings, wherein like reference numerals refer to like parts throughout the several views.

DETAILED DESCRIPTION

Figure 1:
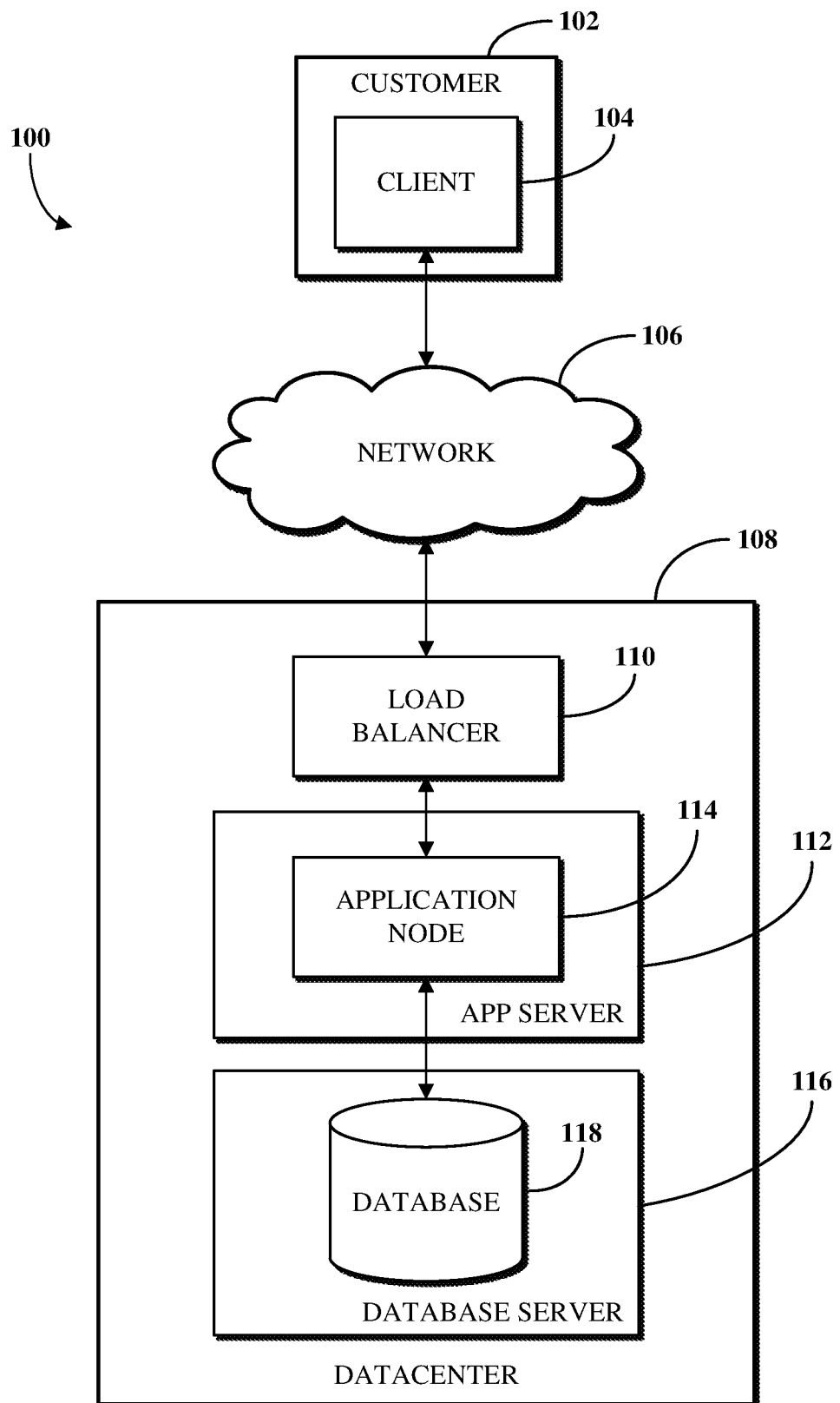
FIG. 1 is a block diagram of an example of an electronic computing and communications system.

In an electronic computing and communications system ("computing system"), a client can present, output, or display a representation of information associated with data stored on a server. The information can indicate, for example, a performance of the computing system or a performance of users associated with the computing system. For example, the information can be associated with incident records stored in a database on the server. An incident record can include information about a system or service interruption associated with components of the computing system. For example, an email delivery service associated with the computing system can be interrupted by a fault associated with a component of the computing system that supports the email delivery service. An incident record can be created and stored in the database when the email delivery service is interrupted. The client can display information associated with aggregated data. Aggregated data can include a combination of multiple pieces of information associated with records stored in the database. For example, the client can display a value or a result associated with an average priority of open incident records associated with the computing system.

The client can generate a request for information (e.g., information the client will display) from the server. The server can search or query a database to identify records associated with the request from the client. For example, the client can request a value associated with an average priority of open incident records. One approach to respond to such a request would be for the server to query the database for priority values associated with open incident records. The server can generate aggregate data associated with the identified records from the database, such as in the form of an aggregate value. An aggregate value can include a value corresponding to a result of a combination of multiple related values, a value derivative of multiple related values, or the like. For example, an aggregate value can include a value generated using an operation specified by an aggregate type, such as an average, a count, a sum, a maximum, a minimum, a count distinct, or other suitable operations that can produce a value from multiple values. In an example, the server can determine an aggregate value of an average priority of open incident records by summing the priority values and dividing the sum of the priority values by a number of identified records. The server can communicate the aggregate value to the client. The client can display the aggregate value. Over time, the information displayed by the client can become stale and can differ from data associated with the records stored in the database. For example, after the client receives the aggregate value, one or more records used to determine the aggregate value can change, one or more records can be added that might change the determination of the aggregate value, one or more records can be deleted that might change the determination of the aggregate value, or combinations thereof.

An approach for updating the aggregate value can include the client periodically generating a request for information from the server to update the information displayed by the client. This can include the server identifying records in the database associated with the request, determining an updated aggregate value associated with the identified records, and communicating the updated aggregate value to the client, all of which can be time-consuming and resource intensive. Furthermore, during the time between the client displaying an aggregate value and the client requesting an updated aggregate value, the aggregate value can be different from the data stored in the database. This can make the aggregate value an unreliable representation of the data.

An improved approach to updating information displayed by a client can involve a system or technique for automatically updating the information in real-time (e.g., which can include refreshing or updating the information responsive to the change). The system or technique can include determining an initial aggregate value associated with a request from the client. For example, the system can generate an initial average priority of open incidents. The system can store metadata associated with the determination of the initial aggregate value. For example, the system can store a total value of priorities of open incidents and a total number of records associated with the total value of priorities. The system can then monitor the database for changes to records associated with the request from the client. When the system identifies one or more changes to records associated with the request, the system can then determine an updated aggregate value based on the metadata and/or one or more changes to records associated with the initial aggregate value. The system can update the metadata associated with the determination of the initial aggregate value to include information associated with the determination of the updated aggregate value. The system can continue to monitor records associated with the request from the client and update the aggregate value in accordance with changes to the records.

By using such an approach, information can be updated on the client more quickly, the updating process can take less computing resources than a full update, or combinations thereof. For example, if it is determined that an update to data does not affect the calculation of an aggregate value, unneeded recomputation of the aggregate value may be avoided. For example, by using the metadata, less data may have to be retrieved from the database to re-compute the aggregate value. For example, by using the metadata, the system may be able to determine that a change to a record may not change the aggregate value, and thus the aggregate value may not need to be updated or an update may not need to be transmitted to the client. For example, the aggregate value may be a maximum value and the new record may add a value that is less than the current aggregate value.

Such an approach may be useful for generating updated aggregate data, such as an aggregate value, because the aggregate value can be derivative of, or generated from one or more sets of data that can affect the validity of, or can cause a change in the aggregate value. Thus, monitoring the aggregate value for a change may not be effective to update the client automatically in real-time because the aggregate value may only be updated, for example, on a periodic basis. Instead, the underlying data used to generate the aggregate value can be monitored and the aggregate value can be updated as needed, and by using previously stored metadata, which may reduce the computational resources needed to generate the updated aggregate value.

Implementations of this disclosure provide technological improvements particular to computer networks, for example, those concerning generating aggregate data, such as an aggregate value, displayed by a client. Computer network-specific technological problems, such as data displayed by a client becoming stale, can be wholly or partially solved by implementations of this disclosure. For example, by monitoring records in a database and automatically updating information displayed by a client based on changes to the records. The implementations of this disclosure introduce new and efficient improvements in the ways in which information displayed by a client is automatically updated by monitoring records in a database associated with the information and updating, automatically, the information based on changes to the records.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102. The customer 102 can be a public entity, private entity, or other corporate entity or individual that purchases or otherwise uses services of a software provider, such as a software-as-a-service ("SaaS") provider or a platform-as-a-service ("PaaS") provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical module or as a combination of physical modules. In some implementations, a single physical module can include multiple clients.

The client 104 can be an instance of an application running on a customer device associated with the customer 102. As used herein, the term "application" can include, but is not limited to, applications, programs, instances, processes, threads, services, plugins, patches, application version upgrades, or any other identifiable computing module capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

In some implementations, the client 104 and the servers associated with the datacenter 108 are configured to connect to, or communicate via, a network 106. A client 104 associated with the customer 102 may connect to the network 106 via a communal connection point, link, or path and a client 104 associated with the customer 102 can connect to, or communicate via, the network 106 using a distinct connection point, link, or path. A connection point, link, or path can be wired, wireless, use other communications technologies, or a combination thereof.

The network 106 can include, for example, the Internet. In some implementations, the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communication traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Any number of application servers or database servers can be implemented at the datacenter 108. The datacenter 108 can include servers other than or in addition to the application server 112 or the database server 116, for example, a web server.

The application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

In some implementations, the application server 112 can include any suitable number of application nodes, depending upon a system load or other characteristics associated with the application server 112. For example, and without limitation, the application server 112 can include two or more nodes forming a node cluster. The application nodes implemented on a single application server 112 can run on different hardware servers.

The database server 116 can be configured to store, manage, or otherwise provide data for delivering services to the client 104 over a network. In some implementations, the database server 116 includes a data storage module, such as a database 118, which can be accessible by an application executed on the application node 114. In some implementations, the database 118 can be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100 can include an XML database and a CMDB. While limited examples are described, the database 118 can be configured as or comprise any suitable database type. Further, the system 100 can include one, two, three, or any suitable number of databases configured as or comprising any suitable database type or combination thereof.

The database 118 can be configured as a CMDB. A CMDB can include a plurality of configuration items (CIs), attributes associated with the CIs, or relationships between CIs. A CI can be a CMDB record that represents an infrastructure entity, device, or modules of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI. The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the database 118), tables, other suitable information sources, or portions or combinations thereof can be stored, managed, or otherwise provided by one or more of the elements of the system 100 other than the database server 116, such as the client 104 or the application server 112.

Some or all of the systems and methods described herein can operate or be executed on or by the servers associated with the system 100. For example, an update for an application executed on the application node 114 can include updating or upgrading the database 118. In some implementations, the systems and methods described herein, portions thereof, or combinations thereof can be implemented on a single device, such as a single server, or a combination of devices, for example, a combination of the client 104, the application server 112, and the database server 116.

The system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

In some implementations, the network 106, one or more datacenters, such as the datacenter 108, and one or more load balancers, such as the load balancer 110, can be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single module in FIG. 1, a load balancer 110 can be implemented as multiple physical or logical modules. For example, a distributed computing system can include distinct routing modules, load balancing modules, firewall modules, or the like.

The primary datacenter can include a primary database, such as the database 118, and the secondary datacenter can include a secondary database. In some implementations, the secondary database can include an exact or substantially exact mirror, copy, or replication of the primary database. The primary database or the secondary database can be implemented as a relational database management system (RDBMS), an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-modules. In some implementations, customers or customer sub-modules can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
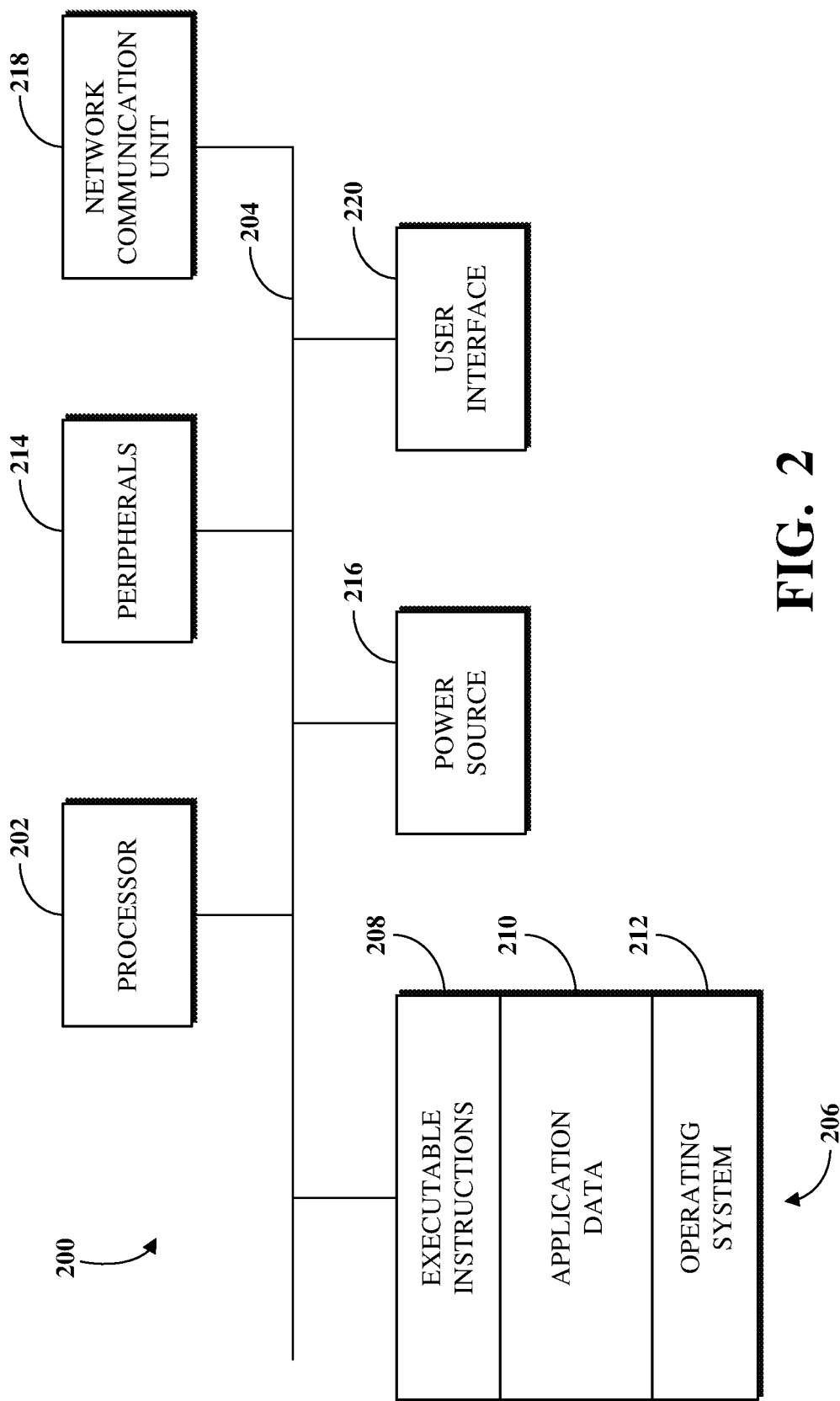
FIG. 2 is a block diagram of an example internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices. A computing device 200 can include components or modules, such as a processor 202, a bus 204, a memory 206, peripherals 214, a power source 216, a network communication unit 218, a user interface 220, other suitable components, or a combination thereof.

The processor 202 can be a central processing module (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or modules that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple modules. For example, a computing device 200 can include volatile memory, such as RAM, and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to automatically update information displayed by the client 104. The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, or an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification module, such as a global positioning system (GPS) location module. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. The user interface 220 can include a display, which can be a liquid crystal display (LCD), a cathode-ray tube (CRT), a light emitting diode (LED) display, (e.g., an OLED display), or other suitable display.

In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

Figure 3:
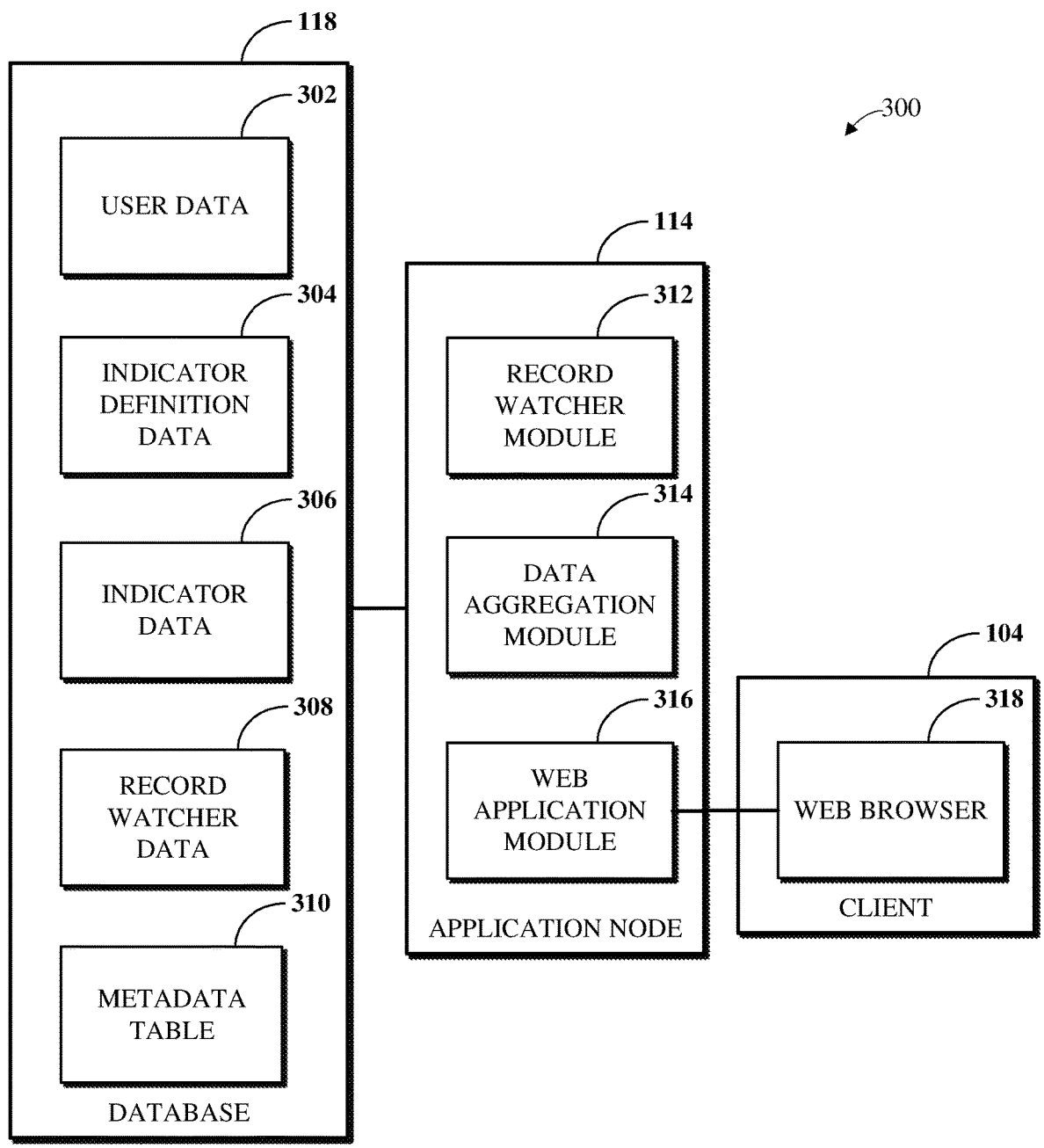
FIG. 3 is a block diagram of an example of an automatic information generation system.

FIG. 3 is a block diagram of an example of an automatic information generation system 300 ("system 300"). System 300 can, for example, be implemented using an implementation of the electronic computing and communications system 100 of FIG. 1 or one or more implementations of computing devices 200 of FIG. 2. The system 300 can be implemented as part of platform software running on a datacenter, such as the datacenter 108. The platform software can be part of a Platform-as-a-Service (PaaS) which can be provided, for example using datacenter 108 of the computing system 100. In some examples, the modules of system 300 can be part of or associated with the platform software (e.g., software components associated with the platform software), scripts stored on the datacenter 108 that are executed by the platform software, or combinations thereof. For example, the data aggregation module 314 can be implemented using a script stored in database 118 and executed by application node 114. As another example, the data aggregation module 314 can be implemented using Java, C, or a similar programming language, that can be compiled or interpreted and included in or associated with the platform software. The platform software can execute the modules of system 300 such as data aggregation module 314.

The system 300 can be configured to automatically update information displayed by a client. The system 300 can include a client, such as the client 104 of FIG. 1, an application node, such as the application node 114 of FIG. 1, a database, such as the database 118 of FIG. 1, or combinations thereof.

For example, the client 104 can be used by a user to launch a web browser 318. The web browser 318 can be configured to output, present, or display information associated with the computing system 100. For example, the client 104 can include a display device, such as a monitor. The web browser 318 can display the information on the display device associated with the client 104.

The information displayed by the web browser 318 can include information associated with records stored in the database 118. For example, the information can include a list of records, one or more values or results associated with records stored in the database 118, other suitable information associated with records stored in the database 118, or combinations thereof. The user data 302 of database 118 can include a plurality of records. The records can include incident records, problem records, change records, other suitable records, or combinations thereof. In an example, an incident record can include information about a system or service interruption associated with components of the computing system 100. For example, an email delivery service associated with the computing system 100 can be interrupted by a fault associated with a component of the computing system 100 that supports the email delivery service and incident record(s) can be generated resulting from that fault (e.g., automatically, by IT support staff, by a user, in response to a complaint by a user, or the like).

For example, an incident record can be created and stored in user data 302 of the database 118 when the email delivery service is interrupted. In some implementations, the information displayed by the web browser 318 can include aggregate data such as an aggregate value or result. Aggregate data can, for example, be derivative of or be a combination of multiple pieces of information associated with records stored in the database 118. For example, multiple incident records stored in the database 118 can be aggregated to generate an average priority of open incident records associated with the computing system 100. The incident records used to generate the average priority of open incident records can, for example, include priority values associated with the incident records, a status (e.g., open, closed, or other suitable status) associated with the incident records, and other information associated with the incident records.

The web browser 318 can generate a request for information that can be displayed by the web browser 318. The web browser 318 can send the request for information to the application node 114. The application node 114 can include a record watcher module 312, a data aggregation module 314, a web application module 316, or combinations thereof. The web application module 316 can receive the request for information from the web browser 318.

The request for information can include a request for or otherwise cause a request for aggregate data associated with an indicator. The aggregate data can include an aggregate value, which can be a value generated based on the indicator. In an example, the request for information an include a request for a latest aggregate value associated with an indicator associated with the computer system 100. An indicator can be, for example, a metric or key performance indicator. An indicator can be defined by an indicator definition which can be used to generate information about the indicator. For example, an indicator can be used to generate an aggregate value (which can also be referred to as an indicator value) from a set of records stored in the user data 302. The indicator can, for example, indicate a measurement of performance of components of the computing system 100, a measurement of performance of users associated with the computing system 100, other suitable measurements of performances, or combinations thereof. For example, an indicator can be defined to aggregate information associated with incidents associated with the computing system 100 (e.g., a number of open incidents, an average time to close incidents, or other suitable information about incidents), information associated with usage statistics associated with one or more components of the computing system 100 (e.g., CPU usage, memory usage, or other suitable usage statistics), other suitable information associated with or stored in the computing system 100, or combinations thereof.

In some implementations, the system 300 can generate an aggregate value associated with an indicator on a periodic basis. For example, the computing system 100 can generate an aggregate value associated with an indicator nightly, weekly, monthly, or on the basis of another suitable period.

The database 118 can include user data 302, indicator definition data 304, and indicator data 306. The user data 302 can include a plurality of user data records. For example, the user data 302 can include user data records associated with incidents associated with the computing system 100, usage statistics associated with the computing system 100, other suitable information associated with the computing system 100, or combinations thereof.

Indicator definition data 304 can store a plurality of indicator records. Indicator records include information about indicators, such as how to generate an aggregate value associated with an indicator. An indicator record in indicator definition data 304 can define a type of record in the user data 302 that is associated with an indicator, a record field that is that is relevant to the indicator, information about how to generate an aggregate value associated with the indicator, other suitable information, or combinations thereof. For example, an indicator record in indicator definition data 304 can define an indicator that indicates a total number of open incident records. The indicator record can indicate that the type of record in the user data 302 used to generate the indicator includes incident records, that the record field includes a status of the incident records (e.g., open), and that generating an aggregate value associated with the indicator includes counting the records associated with the indicator (e.g., incident records that have a status of open).

In another example, an indicator record in the indicator definition data 304 can define an indicator that indicates an average priority of open incident records associated with the computing system 100. The indicator record can indicate that the type of record in the user data 302 associated with the indicator includes incident records, that the record field includes a priority field having a priority value associated with the incident records and a status field having a status (e.g., open) associated with the incident records, and that generating an aggregate value associated with the indicator includes summing the priority values and dividing the sum of the priority values by a total number of open incident records.

The system 300 can use an indicator record in the indicator definition data 304 and a set of records in the user data 302 associated with the indicator record to generate aggregate data, such as an aggregate value, associated with an indicator on the periodic basis. For example, indicator data associated with an indicator that indicates an average priority of open incidents can include an aggregate value that equals the average priority. The system 300 can store the aggregate value associated with the indicator in indicator data 306. The indicator data 306 can, for example, be stored in one or more tables associated with the database 118.

When the request for information sent by the web browser 318 includes a request for a latest aggregate value associated with an indicator, the web application module 316 can access the database 118 to retrieve the latest aggregate value associated with the indicator. For example, the latest aggregate value is the aggregate value last calculated for the indicator. For example, the indicator can be updated periodically and the latest aggregate value is the one from the last periodic update. The request, for example, may only request a latest aggregate value if a stale or somewhat out-of-date calculation of the aggregate value is suitable for display. The web application module 316 can retrieve an aggregate value in the indicator data 306 corresponding to an aggregate value associated with an indicator associated with the request for information. The web application module 316 can communicate the aggregate value to the web browser 318. The web browser 318 can display the aggregate value.

In some implementations, the request for information sent by the web browser 318 can include a request for a current aggregate value associated with an indicator. For example, the request for information can include a request for a total number of open incident records associated with the computing system 100. The web application module 316 can communicate the request for information to the data aggregation module 314. The data aggregation module 314 can be configured to communicate with the database 118 to determine a current aggregate value associated with the indicator based on the request for information. The data aggregation module 314 can identify an indicator record in indicator definition data 304 corresponding to the indicator associated with the request for information. The data aggregation module 314 can apply the indicator record to the user data 302. For example, the indicator record corresponding to the indicator that indicates a total number of open incident records can include the information described above. The data aggregation module 314 can identify incident records associated with the user data 302 that have a status indicating that the incident record is open. The data aggregation module 314 can count the identified incident records and store an aggregate value (e.g., a total number of open incident records) corresponding to the indicator in the indicator data 306.

The data aggregation module 314 can determine an average, a count, a sum, a maximum, a minimum, a count distinct, or other suitable values associated with indicators associated with the computing system 100. For example, the request for information can include a request for an aggregate value associated with an indicator that indicates an average priority of open incident records. The data aggregation module 314 can identify an indicator record in the indicator definition data 304 that corresponds to the indicator. The indicator record can correspond to the indicator that indicates an average priority of open incident records and can include information as described above. The data aggregation module 314 can apply the indicator record to the user data 302 to identify a set of records. The set of records can include open incident records in the user data 302.

The data aggregation module 314 can identify a record field associated with the identified records having information that is relevant to the indicator based on the record field defined in the indicator record. In some examples, the indicator record can define more than one record field. For example, the more than one record fields defined in the indicator record can include a priority field associated with the incident records and a status field associated with the incident records. The priority field can include a priority value associated with an incident record and the status field can indicate a status of the incident record (e.g., open or closed). The incident record can define a value associated with a record field. For example, the incident record can define that the status record field include a status value of open. The data aggregation module 314 can identify priority values associated with the set of records in the user data 302 that include a status of open (e.g., open incident records).

The data aggregation module 314 can generate an aggregate value associated with the indicator based on the indicator record. For example, the indicator record can define that generating an aggregate value associated with the indicator includes summing the priority values and dividing the sum of the priority values by the total number of open incident records. The data aggregation module 314 can generate the average priority of the open incident records by summing the priority values and dividing the sum of the priority values by a total number of identified open incident records. The data aggregation module 314 can store the aggregate value in the indicator data 306. The data aggregation module 314 can communicate the aggregate value to the web application module 316. The web application module 316 can communicate the aggregate value to the web browser 318. The web browser 318 can display the aggregate value.

The record watcher module 312 can be configured to generate a record watcher record and store the record watcher record in record watcher data 308 based on the indicator. The record watcher data 308 can store a plurality of record watcher records. The plurality of record watcher records can be previously generated by the record watcher module 312 or created by a user associated with the computing system 100. The record watcher module 312 can generate a record watcher record that references records in the user data 302 used to generate an aggregate value. For example, a record watcher record can indicate a type of record in the user data 302 used to generate the aggregate value (e.g., the type of record can include open incident records). The record watcher module 312 uses a record watcher record to monitor records in the user data 302 used to generate an aggregate value. For example, record watcher module 312 can use the record watcher record that includes information about records used to generate an average priority value of open incident records to monitor open incident records. The record watcher module 312 can monitor the records in the user data 302 to identify changes to the records in the user data 302. The record watcher module 312, in response to identifying a change to the records associated with an aggregate value, can communicate information about the change to the data aggregation module 314. As will be described further later, the data aggregation module 314 can generate an updated aggregate value based on the change.

In some implementations, the data aggregation module 314 can be configured to store metadata associated with the generated aggregate value in a metadata table. For example, the database 118 can include a metadata table 310. The metadata can be stored as a metadata record in the metadata table 310. A metadata record can include an aggregation type indicating the type of aggregation that is associated with the metadata record, an aggregation field indicating a record field associated with the records used to generate an aggregate value, a latest score value indicating a latest generated aggregate value (e.g., as described above, the indicator score can be updated on a periodic basis, such as nightly), a precision value indicating a desired mathematical precision of the aggregation type, a count value indicating a number of records used to generate the aggregate value, a sum value indicating a sum of the values associated with the aggregation field used to generate the aggregate value, an aggregation value indicating a result of an aggregation of the aggregation type, and an aggregation supplement field indicating supplemental information associated with an aggregation of the aggregation type, other suitable information, or combinations thereof. For example, the data aggregation module 314 can generate an aggregate value corresponding to the average priority of open incident records in the user data 302.

Generating the average priority of open incident records can include summing priority values associated with identified open incident records, counting the number of open incident records, and dividing the sum of the priority values by the number of open incident records. For example, the user data 302 can include three open incident records. A first open incident record can have a priority of 2, a second open incident record can have a priority of 3, and a third open incident record can have a priority of 2. The data aggregation module 314 can sum the priority values associated with the three open incident records. The sum of the priority values associated with the three open incident records (e.g., 7) can be stored. The data aggregation module 314 can count the number of open incident records (e.g., 3). The count value (e.g., 3) can be stored. The data aggregation module 314 can generate the average priority of the open incident records by dividing the sum of the priority values, 7, by the total number of open incident records, 3. The average priority of open incident records (e.g., 2.33, 7 divided by 3) can be stored. The data aggregation module 314 can generate a metadata record that includes an aggregation type of average, an aggregation field of priority (e.g., the priority record field associated with records used to generate the aggregation value includes information relevant to the generation of the aggregation value), a latest score value of 0, a precision of 0, a count of 3, a sum value of 7, an aggregation value of 2.33, and an empty aggregation supplement field. In the above example, the information stored in the metadata record can be used to generate an updated aggregation value without having to retrieve all of the records in the user data 302 used to generate the aggregation value stored in the metadata record. For example, information associated with records used to generate the aggregate value can change. In one example, a priority value associated with a record used to generate the aggregate value can be changed by a user associated with the computing system 100. The data aggregation module 314 can generate an updated aggregation value by using the count value and the sum value stored in the metadata record. For example, the data aggregation module 314 can adjust the sum value to reflect the changed priority value (e.g., the data aggregation module 314 can increase or decrease the sum value based on the changed priority value) and can generate an updated aggregate value be dividing the adjusted sum value by the count value.

In another example, the data aggregation module 314 can determine a count of records. For example, the data aggregation module 314 can determine a total number of open incident records. The data aggregation module 314 can generate a metadata record that includes an aggregation type of count, a blank aggregation field (e.g., because values associated with record fields are not necessary to count records), a latest score of 0, a precision of 0, a count value that includes the total number of open incident records, a blank sum value, an aggregation value that equals the count value, a blank aggregation supplement field, other suitable information, or combinations thereof. In another example, the data aggregation module 314 can determine a sum value associated with a type of record. For example, the data aggregation module 314 can determine a sum of priority values associated with open incident records. The data aggregation module 314 can generate a metadata record that includes an aggregation type of sum, an aggregation field of priority, a latest score of 0, a precision of 0, a count value equal to the number of open incident records, a sum value equal to the sum of priority values equal to the sum of priority values associated with the open incident records, an aggregation value equal to the sum value, and a blank aggregation supplement field. While the above examples include a latest score of 0 and a precision of 0, the metadata record can include a latest score indicating periodically generated aggregate value associated with an indicator that was previously generated and a precision score indicating a desired precision associated with the aggregation of the aggregation type.

In another example, the data aggregation module 314 can determine a maximum priority value associated with identified open incident records. For example, the user data 302 can include three open incident records with a priority of 4, two open incident records with a priority of 3, two open incident records with a priority of 2, and five open incident records with a priority of 1. The data aggregation module 314 can compare the priority values associated with the open incident records. For example, the maximum priority value in the above example is 4. The data aggregation module 314 can generate a metadata record that includes an aggregation type of max, an aggregation field of priority, a latest score value of 0, a precision of 0, an empty count value, an empty sum value, an aggregation value of 5, and an aggregation supplement field that includes an array of values indicating a number of records having a particular priority. For example, the aggregation supplement field can include an array including (3: "4", 2: "3",2: "2",5: "1") (e.g., three incident records with a priority of 4, two incident records with a priority of 3, two incident records with a priority of 2, and five incident records with a priority of 1). The information stored in the aggregation supplement field can be used to determine an updated aggregation value (e.g., an updated maximum priority value) when, for example, a priority value associated with one of the open incident records is changed without having the retrieve the records used to generate the aggregation value stored in the metadata record.

In another example, the data aggregation module 314 can determine a minimum value associated with a type of records. For example, the data aggregation module 314 can determine a minimum priority value associated with the open incident records. The user data 302 can include three open incident records with a priority of 4, two open incident records with a priority of 3, two open incident records with a priority of 2, and five open incident records with a priority of 1. In the above example, the minimum priority value is 1. The data aggregation module 314 can generate a metadata record that includes an aggregation type of min, an aggregation field of priority, a latest score value of 0, a precision of 0, an empty count value, an empty sum value, an aggregation value of 1, and an aggregation supplement field that includes an array of values indicating a number of records having a particular priority. For example, the aggregation supplement field can include an array including (3: "4", 2: "3", 2: "2", 5: "1") (e.g., three incident records with a priority of 4, two incident records with a priority of 3, two incident records with a priority of 2, and five incident records with a priority of 1).

In another example, the data aggregation module 314 can determine a count distinct value associated with a type of record. For example, the data aggregation module 314 can determine a count distinct value associated with open incident records. The user data 302 can include three open incident records with a priority of 4, two open incident records with a priority of 3, two open incident records with a priority of 2, and five open incident records with a priority of 1. The data aggregation module 314 can generate a metadata record that includes an aggregation type of count distinct, an aggregation field of priority, a latest score value of 0, a precision of 0, an empty count value, an empty sum value, an aggregation value of 4 (e.g., the number of distinct priority values associated with the open incident records), and an aggregation supplement field that includes an array of values indicating a number of records having a particular priority. For example, the aggregation supplement field can include an array including (3: "4", 2: "3", 2: "2", 5: "1") (e.g., three incident records with a priority of 4, two incident records with a priority of 3, two incident records with a priority of 2, and five incident records with a priority of 1).

The system 300 can be configured to automatically update an aggregate value displayed by the web browser 318. As described above, the aggregate value associated with the indicator, and displayed by the web browser 318, can become stale over time and differ from information associated with the user data 302. The aggregate value can be updated using the record watcher module 312. As described above, the data aggregation module 314 can generate an aggregate value associated with an indicator. The records associated with the indicator can be changed by a user associated with the computing system 100 or automatically by the computing system 100. For example, a user can open a new record, delete a record, change information associated with a record, or combinations thereof. Changes to records associated with an indicator can affect a validity of an aggregate value associated with the indicator. For example, an aggregate value can become invalid when a change to a record associated with the aggregate value is changed in a way that affects values used to generate the aggregate value. For example, an incident record can be closed after the data aggregation module 314 identifies open incident records associated with the computing system 100. An aggregate value generated based on open incident records would no longer be valid if one of the open incident records used to generate the aggregate value was no longer open.

The record watcher module 312 can monitor records associated with the aggregate value displayed by the web browser 318. For example, the record watcher module 312 can identify a record watcher record stored in the record watcher data 308. The record watcher record on can include an information indicating that the record watcher record is associated with the aggregate value. For example, a record watcher record can include an identification number that is associated with an aggregate value (e.g., an aggregate value displayed by the web browser 318). The record watcher module 312 can identify a record watcher record associated with the aggregate value based on the indication that the record watcher record is associated with the aggregate value.

The record watcher record can include information about a set of records in the user data 302 used to generate the aggregate value. For example, the record watcher record can include a type of record stored in the user data 302 used to generate the aggregate value. For example, the aggregate value can include a count of open incident records. The record watcher record can include a type of record (e.g., open incident records) used to generate the aggregate value.

In some implementations, the record watcher module 312 can be configured to identify database operations that can change the records by monitoring records associated with the record watcher record. In some examples, identifying database operations can include intercepting database operations associated with the records associated with a record watcher record. For example, the record watcher module 312 can monitor calls to a database interface included in platform software executing on application node 114. The database interface can be configured to make changes to database 118 responsive to the calls. For example, the database interface can be an application programming interface (API). The calls can include information associated with impending or imminent database operations, such as an insert operation (e.g., an operation to add a new record), an update operation (e.g., an operation to update information associated with an existing record), or a delete operation (e.g., an operation to delete an existing record). In other implementations, changes to database 118 can instead be detected when they are made, after they are made, or using other techniques, such as database triggers or the like.

When the record watcher module 312 identifies a database operation that will affect records associated with an aggregate value, the record watcher module 312 can identify a record ("identified record") associated with database operation (e.g., a record that will be affected by the database operation). For example, the identified database operation can include information about a record that the database operation will add, delete, or change. The record watcher module 312 can identify an existing record that the database operation will change (e.g., change or delete) or a new record that the database operation will create. For example, the database operation can change information stored in an open incident record. The record watcher module 312 can identify the open incident record. When the record watcher module 312 identifies the identified record associated with the database operation, the record watcher module 312 can communicate the database operation and the identified record to the data aggregation module 314.

The data aggregation module 314 can be configured to determine whether the database operation will affect the record associated with the database operation in a way that affects the validity of the aggregate value displayed by the web browser 318. For example, the aggregate value displayed by the web browser 318 can include an average priority of open incident records. The database operation can include an operation to change the owner of an open incident record. Because changing the owner of an open incident record does not affect the average priority of open incident records (e.g., the priority of the open incident record did not change and the status of the open incident record did not change), the database operation does not affect the aggregate value displayed by the web browser 318, In another example, the database operation can include an operation to change the priority of an open incident record. Because changing the priority of an open incident record will affect the validity of aggregate value associated with the average priority of open incident records (e.g., the total of the priority values associated with the open incident records will be changed), the database operation will affect the aggregate value displayed by the web browser 318.

When the data aggregation module 314 determines that the database operation will affect the associated record in a way that affects the validity of the aggregate value displayed by the web browser 318, the data aggregation module 314 can identify a metadata record associated with the aggregate value displayed by the web browser 318. As described above, the data aggregation module 314 can generate a metadata record associated with a generated aggregate value. The data aggregation module 314 can identify a metadata record that is associated with aggregate value based on the information stored in the metadata record that indicates that the metadata record is associated with the aggregate value. For example, the aggregate value can include an average priority of open incident records. The data aggregation module 314 can identify a metadata record that includes an aggregation type of average and an aggregation field of priority.

The data aggregation module 314 can be configured to determine whether the database operation will change a record associated with the aggregate value displayed by the web browser 318, add a new record, or delete a record associated with the aggregate value displayed by the web browser 318. For example, the database operation can change a record associated with the aggregate value displayed by the web browser 318 (e.g., an "existing record"). The data aggregation module 314 can determine that the database operation will or will not change an existing record based on information associated with the identified record (e.g., the record associated with the database operation). For example, a record can include a record identification number. The data aggregation module 314 can compare an identification number of the identified record with identification numbers associated with the existing records. When the data aggregation module 314 identifies an identification number associated with an existing record that matches the identification number associated with the identified record, the data aggregation module 314 can determine that the database operation will not affect an existing record (e.g., because a count of the records will not change). As another example, if a change to a record changes information not associated with the indicator, then data aggregation module 314 can determine that the database operation will or will not affect an existing record (e.g., if the indicator covers a count of open incidents, or the distinct count of incident priorities, then a change to the comments of an incident will not affect the aggregate value of the indicator).

The data aggregation module 314 can generate an updated aggregate value based on the metadata record and the database operation. For example, the aggregate value displayed by the web browser 318 can include an average priority of open incident records. The metadata record can include a count value associated with the number of open incident records corresponding to the value displayed by the web browser 318, a sum value associated with a sum of priority values associated with the value displayed by the web browser 318, and an aggregation value equal to the value displayed by the web browser 318. The data aggregation module 314 can reduce the sum value by a priority value associated with the existing record and increase the sum value by a value of the priority field updated by the database operation (e.g., the value in the priority field that the existing record will have after the database operation is applied to the existing value). For example, the database operation can include changing a value of a priority field of an open incident record from 3 to 2. The data aggregation module 314 can subtract 3 from the sum value stored in the metadata record and add 2 to the sum value stored in the metadata record. The data aggregation module 314 can generate an updated average priority of open incident records by dividing the sum value by the count value to generate an updated aggregate value.

In another example, the database operation can include deleting or removing a record associated with the aggregate value displayed by the web browser 318. For example, the database operation can include changing a status of an open incident record from open to closed. The data aggregation module 314 can generate an updated aggregate value by removing information associated with the deleted or removed record from the information stored in the metadata record. For example, the data aggregation module 314 can subtract a value of the priority field associated with the deleted or removed record from the sum value stored in the metadata record and decrease count value stored in the metadata record by one (e.g., the total number of open incident records will be decreased by one when the database operation is applied). The data aggregation module 314 can generate an updated average priority of open incident records by dividing the sum value by the count value to generate an updated aggregate value.

In another example, the database operation can include creating a new record to add to the user data 302. For example, the database operation can include creating a new incident record. The data aggregation module 314 can generate an updated aggregate value by including information associated with the new record in the information stored in the metadata record. For example, the data aggregation module 314 can add a value of a priority field associated with the new record to the sum value stored in the metadata record and count value stored in the metadata record by 1. The data aggregation module 314 can divide the sum value by the count value to generate an updated aggregate value.

In another example, the aggregate value displayed by the web browser 318 can include a maximum, a minimum, or a count distinct, as described above. For example, the aggregate value displayed by the web browser 318 can include a maximum priority value associated with open incident records. When the record watcher module 312 communicates a database operation and an identified record to the data aggregation module 314 (e.g., because the record watcher module 312 identified a database operation that affects records used to generate the aggregate value), the data aggregation module 314 can identify a metadata record having an aggregation type of max and an aggregation type of priority. When the database operation includes an operation to add a new record to the user data 302, the data aggregation module 314 can determine whether a value of a priority field associated with the new record is greater or less than the aggregation value associated with the metadata record (e.g., a current maximum value) by comparing the value of the priority field associated with the new record with the aggregate value. When the data aggregation module 314 determines the value in the priority field associated with the new record is less than the aggregate value, the data aggregation module 314 can update the aggregation supplement field to include the value of the priority field associated with the new record. When the data aggregation module 314 determines that the value of the priority field associated with the new record is greater than the aggregate value (e.g., the value of the priority field associated with the new record is the maximum priority value of open incident records), the data aggregation module 314 can update the aggregate value to include the value of the priority field associated with the new record and update the aggregation supplement field to include the value of the priority field associated with the new record.

When the database operation includes an operation to delete a record, the data aggregation module 314 can remove a value of the priority field associated with the record to be deleted from the aggregation supplement field. The data aggregation module 314 can then determine a current maximum value based on the remaining priority values in the aggregation supplement field. The data aggregation module 314 can update the aggregate value to include the current maximum value of the open incident records. When the database operation includes an operation to update a value of the priority field of an existing record, the data aggregation module 314 can remove a value of the priority field associated with the exiting record from the aggregation supplement field and add an updated value of the priority field associated with the existing record. The data aggregation module 314 can generate an updated aggregate value (e.g., a current maximum priority of the open incident records) by identifying a maximum value in the aggregation supplement field.

The data aggregation module 314 can update the metadata record based on the updated aggregate value. For example, the data aggregation module 314 can update the metadata record to include an updated count value, an updated sum value, and an updated aggregation value. The data aggregation module 314 can communicate the updated aggregate value to the web application module 316. The web application module 316 can communicate the updated aggregate value to the web browser 318. The web browser 318 can display the updated aggregate value. In some implementations, the record watcher module 312 can continue to monitor records associated with the aggregate value displayed by the web browser 318. The data aggregation module 314 can continue to update aggregate values until the web browser 318 is inactive. The web browser 318 can become inactive when the web browser 318 is closed, when a user navigates away from the web browser 318, upon the occurrences of or other suitable scenarios that can inactivate the web browser 318.

Implementations of the automatic information generation system 300 shown in FIG. 3 can include additional, less, combined, or other functionality, or combinations thereof, different from those described above. For example, the request for information sent by the web browser 318 can include a request for information at a particular point in time. For example, the request for information can include a request for an average priority of incident records between a first date and a second date. In some implementations, the data aggregation module 314 can generate an aggregate value associated with the request for information based on an aggregate value associated with periodically generated aggregate value and changes to records since the aggregate value was generated. For example, as described above, the computing system 100 can generate an aggregate value associated with an indicator on a periodic basis. The data aggregation module 314 can receive a request to generate a current aggregate value associated with the indicator. The data aggregation module 314 can retrieve the aggregate value associated with the indicator stored in the indicator data 306. The record watcher module 312 can identify records associated with the indicator that have changed since the aggregate value was generated. The data aggregation module 314 can generate a current aggregate value based on the aggregate value and the changes to records associated with the indicator.

Figure 4A:
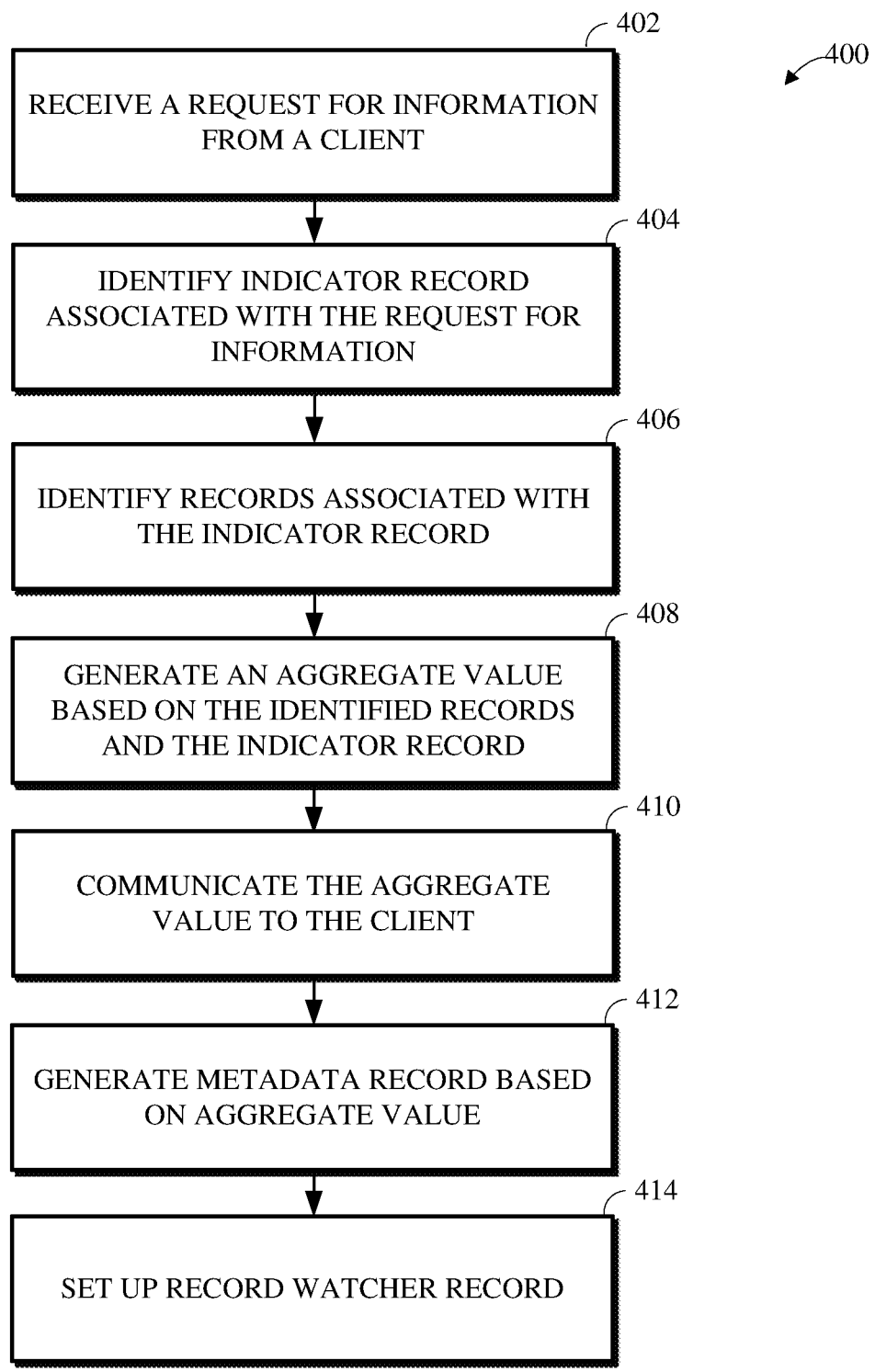
FIGS. 4A and 4B are flowcharts illustrating an example of a technique for automatically generating information displayed by a client.
Figure 4B:
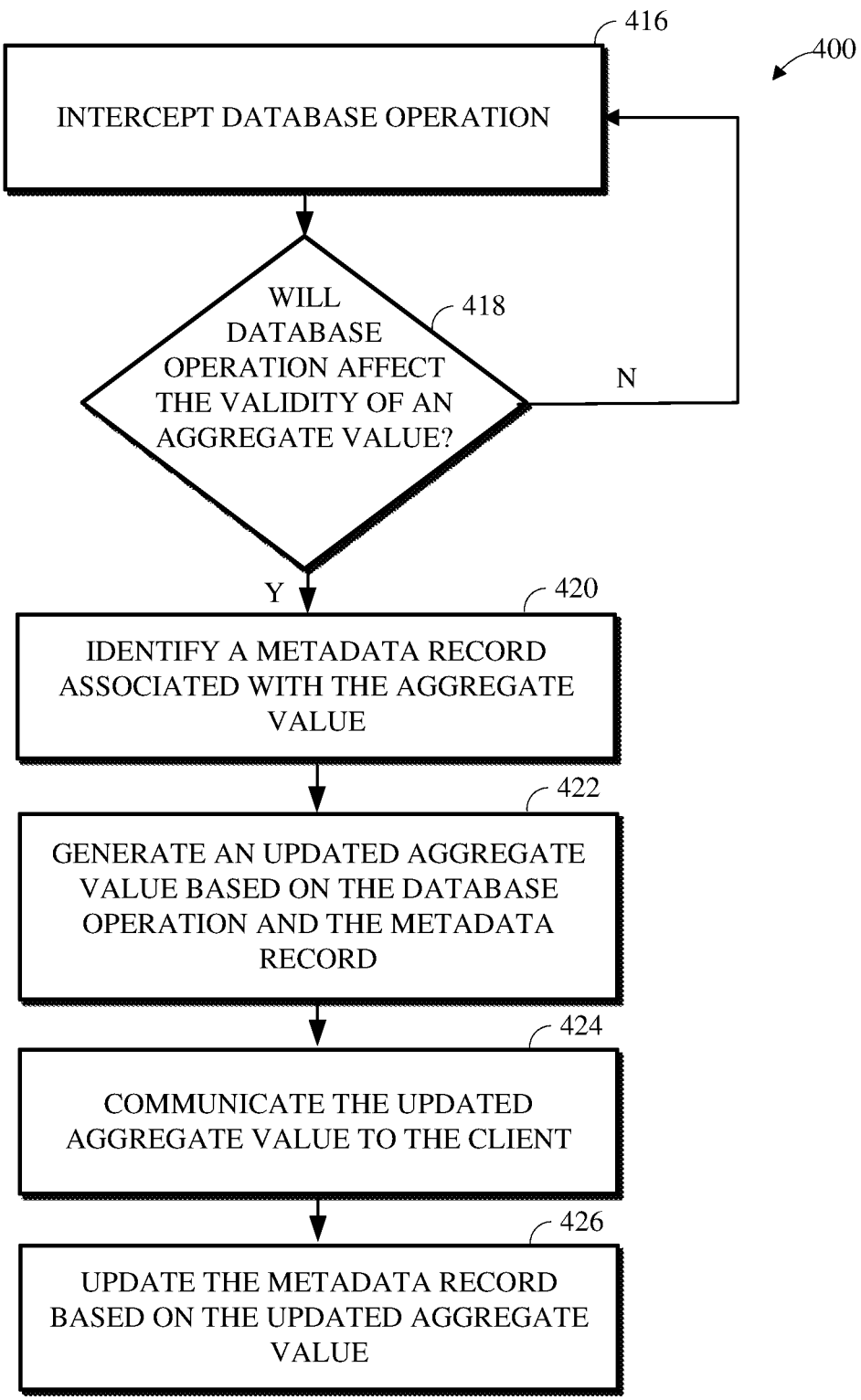

FIGS. 4A and 4B are flowcharts illustrating an example of a technique 400 for automatically generating information displayed by a client in an electronic computing and communications system, such as the system 100 as generally illustrated in FIG. 1. In some implementations, the technique 400 can be executed using computing devices, such as the systems, modules, and devices described with respect to FIGS. 1, 2, and 3 In some implementations, the technique 400 can be performed, for example, by executing a machine-readable program or other computer-executable instructions, such as instructions or programs described according to JavaScript, C, or other such instructions. The steps, or operations, of the technique 400 or any other method, process, or algorithm described in connection with the implementations disclosed herein can be implemented directly in hardware, firmware, software executed by hardware, circuitry, or a combination thereof.

At 402, the technique 400 can receive a request for information from a client. For example, as described above, the client 104 can include the web browser 318. The web browser 318 can generate a request for information to be displayed by the web browser 318. The web browser 318 can send or communicate the request for information to the web application module 316. At 404, the technique 400 can identify an indicator record associated with the request for information. For example, as described above, the web application module 316 can communicate the request for information to the data aggregation module 314. The data aggregation module 314 can identify an indicator record in the indicator definition data 304. At 406, the technique 400 can identify records associated with the indicator record. For example, as described above, the data aggregation module 314 can identify records in the user data 302 based on information associated with the indicator record.

At 408, the technique 400 can determine an aggregate value based on the identified records and the indicator record. For example, as described above, the data aggregation module 314 can generate an aggregate value based on information stored in the identified records and the indicator record. For example, the request for information can include a request for an average priority of open incident records. The data aggregation module 314 can generate the aggregate value based on values in priority fields associated with the identified records and a total number of open incident records (e.g., by dividing the sum of priority values by the total number of open incident records).

At 410, the technique 400 can communicate the aggregate value to the client. For example, as described above, the data aggregation module 314 can communicate the aggregate value to the web application module 316. The web application module 316 can communicate the aggregate value to the web browser 318. The web browser 318 can display the aggregate value. At 412, the technique 400 can generate a metadata record based on the aggregate value. For example, as described above, the data aggregation module 314 can generate a metadata record that can include the information about the aggregate value and about how to generate the aggregate value. At 414, the technique 400 can set up a record watcher record. For example, as described above, the record watcher module 312 can generate a record watcher record that includes information about records used to generate the aggregate value The record watcher module 312 can monitor records associated with the record watcher record.

At 416, the technique 400 can intercept a database operation. For example, as described above, the record watcher module 312 can be configured to intercept database operations associated with the monitored records. At 418, the technique 400 can determine whether the intercepted database operation will affect a validity of an aggregate value displayed by the client. For example, the data aggregation module 314 can determine whether the database operation will affect the validity of the aggregate value displayed by the web browser 318. If the database operation will not affect the validity of the aggregate value displayed by the web browser 318, the technique 400 continues at 416. If the database operation will affect the validity of the aggregate value displayed by the web browser 318, the technique 400 continues at 420.

At 420, the technique 400 can identify a metadata record associated with the aggregate value. For example, as described above, the data aggregation module 314 can identify a metadata record stored in the metadata table 310 that is associated with the aggregate value displayed by the web browser 318. At 422, the technique 400 can generate an updated aggregate value based on the database operation and the metadata record. For example, as described above, the data aggregation module 314 can generate an updated aggregate value based on the database operation and the metadata record. At 424, the technique 400 can communicate the updated aggregate value to the client. For example, the data aggregation module 314 can communicate the updated aggregate value to the web application module 316. The web application module 316 can communicate the updated aggregate value to the web browser 318. The web browser 318 can display the updated aggregate value. At 426, the technique 400 can update the metadata record based on the updated aggregate value. For example, as described above, the data aggregation module 314 can update the metadata record to include updated information about the updated aggregate value.

Although the technique 400 is shown as a series of operations for clarity, implementations of the technique 400 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array, (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures can be understood as corresponding to a functional module implemented using software, hardware (e.g., an ASIC) or a combination of software and hardware. In certain contexts, such modules or monitors can be understood to be a processor-implemented software module or software-implemented monitor that is part of or callable by an executable program, which can itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for updating an aggregate value used to generate a display on a client device, the system comprising:
    a server device including a processor and a memory, the memory including instructions executable by the processor to:
    generate the aggregate value based on a set of records stored in a database;
    generate and store a metadata record that includes the aggregate value and an aggregation type of the aggregate value;
    intercept an impending database operation associated with the set of records;
    determine whether the database operation will affect the aggregate value based on a comparison between the database operation and the metadata record; and
    in response to a determination that the database operation will affect the aggregate value:
        generate an updated aggregate value based on the database operation, the aggregate value, and the aggregate type;
        update the metadata record to include the updated aggregate value; and
        communicate the updated aggregate value to the client device.

2. The system of claim 1, wherein the instructions include instructions executable by the processor to receive a request for information from the client device.

3. The system of claim 2, wherein the instructions include instructions executable by the processor to identify an indicator definition associated with the request for information.

4. The system of claim 3, wherein the instructions include instructions executable by the processor to identify the set of records based on information associated with the indicator definition.

5. The system of claim 1, wherein the instructions include instructions executable by the processor to generate a metadata record that includes an aggregation field, a precision value, a count value, a sum value, an aggregation value, and an aggregation supplement field.

6. The system of claim 1, wherein the database operation includes adding a new record to the set of records.

7. The system of claim 1, wherein the database operation includes deleting a record associated with the set of records.

8. The system of claim 1, wherein the database operation includes updating information associated with a record associated with the set of records.

9. The system of claim 1, wherein the instruction executable by the processor to generate the updated aggregate value comprises generating the updated aggregate value based on the database operation, the aggregate value, and the aggregate type without accessing the set of records.

10. A method for updating an aggregate value used to generate a display on a client device, the method comprising:
    generating the aggregate value based on a set of records stored in a database;
    generating and storing a metadata record that includes the aggregate value and an aggregation type of the aggregate value;
    intercepting a database operation associated with the set of records;
    determining whether the database operation will affect the aggregate value based on a comparison between the database operation and the metadata record before the database operation is executed against the set of records; and in response to a determination that the database operation will affect the aggregate value:
generating an updated aggregate value based on the database operation, the aggregate value, and the aggregate type;
updating the metadata record to include the updated aggregate value; and
communicating the updated aggregate value to the client device.

11. The method of claim 10, comprising receiving a request for information from the client device.

12. The method of claim 11, comprising identifying an indicator definition associated with the request for information.

13. The method of claim 12, comprising identifying the set of records based on information associated with the indicator definition.

14. The method of claim 10, comprising generating a metadata record that includes an aggregation field, a precision value, a count value, a sum value, an aggregation value, and an aggregation supplement field.

15. The method of claim 10, wherein the database operation includes adding a new record to the set of records.

16. The method of claim 10, wherein the database operation includes deleting a record associated with the set of records.

17. The method of claim 10, wherein the database operation includes updating information associated with a record associated with the set of records.

18. A non-transitory computer-readable storage medium, comprising executable instructions that, when executed by a processor, facilitate performance of operations, comprising:
generating an aggregate value based on a set of records stored in a database;
generating and storing a metadata record that includes the aggregate value and an aggregation type of the aggregate value;
intercepting a database operation associated with the set of records;
determining whether the database operation will affect the aggregate value based on a comparison between the database operation and the metadata record; and
in response to a determination that the database operation will affect the aggregate value:
generating an updated aggregate value based on the database operation, the aggregate value, and the aggregate type;
updating the metadata record to include values the updated aggregate value; and
communicating the updated aggregate value to a client device.

19. The non-transitory computer-readable storage medium of claim 18, comprising receiving a request for information from the client device.

20. The non-transitory computer-readable storage medium of claim 19, comprising identifying an indicator definition associated with the request for information.

21. The non-transitory computer-readable storage medium of claim 20, comprising identifying the set of records based on information associated with the indicator definition.

22. The non-transitory computer-readable storage medium of claim 18, comprising generating a metadata record that includes an aggregation field, a precision value, a count value, a sum value, an aggregation value, and an aggregation supplement field.

23. The non-transitory computer-readable storage medium of claim 18, wherein the database operation includes adding a new record to the set of records.

24. The non-transitory computer-readable storage medium of claim 18, wherein the database operation includes deleting a record associated with the set of records.

25. The non-transitory computer-readable storage medium of claim 18, wherein the database operation includes updating information associated with a record associated with the set of records.

26. The non-transitory computer-readable storage medium of claim 18, wherein the metadata record includes a record field that is indicative of the set of records stored in the database.

27. The non-transitory computer-readable storage medium of claim 18, wherein the aggregate value comprises a value of a key performance indicator associated with one or more incident records.

* * * * *

UNITED STATES PATENT AND TRADEMARK OFFICE
CERTIFICATE OF CORRECTION

PATENT NO. : 10,762,077 B2
APPLICATION NO. : 15/336939
DATED : September 1, 2020
INVENTOR(S) : Georgi Kamenov Ivanov Page 1 of 1

It is certified that error appears in the above-identified patent and that said Letters Patent is hereby corrected as shown below:

In the Claims

Column 28, Line 6, Claim 18: please delete the word "values" that comes before the phrase "the updated aggregate value".

Signed and Sealed this
First Day of December, 2020

Andrei Iancu
*Director of the United States Patent and Trademark Office*